HENRY E. ANDERSON, OF RIPON, WISCONSIN.

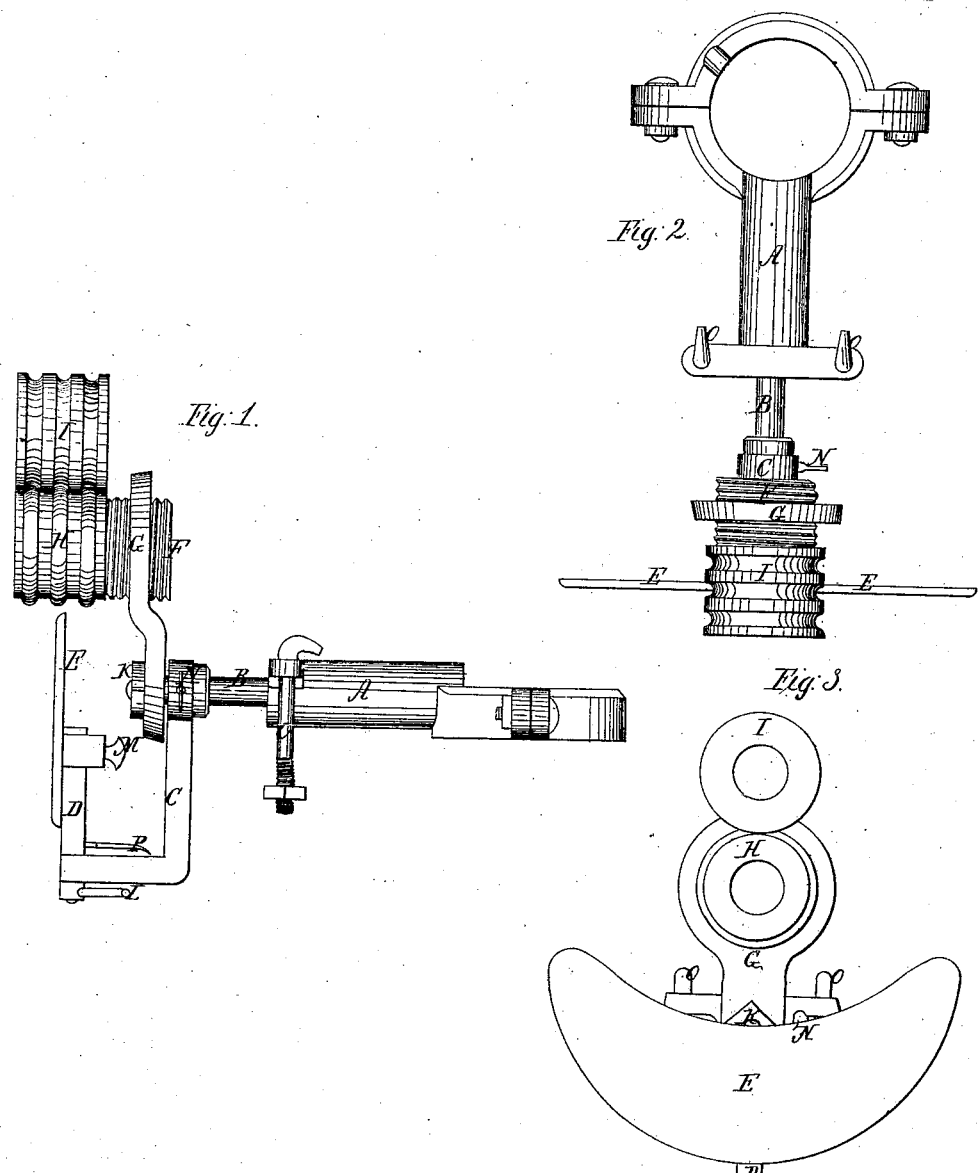

Letters Patent No. 84,248, dated November 24, 1868.

---

IMPROVEMENT IN SWAGING-ATTACHMENT FOR SHEET-METAL-WORKING MACHINES

---

The Schedule referred to in these Letters Patent and making part of the same.

---

*To all whom it may concern:*

Be it known that I, HENRY E. ANDERSON, of the city of Ripon, Fond du Lac county, and State of Wisconsin, have invented a new and useful Improvement in Attachment to a Tin and Sheet-Iron Worker's Beading-Machine for swaging screws on stove-pipe, &c.; and I do hereby declare that the following is a full, clear, and exact description thereof, which will enable those skilled in the art to make and use the same, reference being had to the accompanying drawing, forming part of this specification, in which—

Figure 1 is a side view of my invention, with the swaging-rollers in position;

Figure 2, a top view; and

Figure 3, a front view.

Similar letters of reference in each of the figures indicate corresponding parts.

The object of my invention is to produce an attachment to a tin and sheet-iron worker's beading-machine, for swaging screws on stove-pipes, and for other purposes.

A is the shank-part of the attachment, to fasten to a beading-machine.

B, a round mandrel, that slides in and out of the shank A.

C, frame, which holds the guide E.

D, guide-standard.

E, guide.

F, screw, working in nut G.

G, nut, its lower end attached to mandrel B, with a square oblong hole through it, so that it can be raised or lowered, as occasion may require.

H, the lower swaging-roller.

I, the upper swaging-roller.

These rollers are made with screw-indentations, and are placed upon the revolving arms of a tinner's or iron-worker's beading-machine, so that as the arms are turned, these swaging-rollers turn, and the nut F turns also, and runs out and in according to the way the arms are turned.

K, nut, which holds nut G on to mandrel B.

L, nut, which holds shaft D firmly in position.

M, set-screw, which holds guide E to the shaft D, and arranged so that the guide E may be raised or lowered, according to the size of pipe that may be operated on.

N, set-screw, which holds the frame C to mandrel B.

O, hooks, which screw the attachment to the beading-machine.

P, index-hand, which points to a mark on the frame C, according to the size of pipe to have the screw swaged on, there being a mark for each size, the guide E being set more or less slanting.

Operation.

Attach the machine to a tin or sheet-iron worker's beading-machine; set the guide E, by the index-hand P, according to the size pipe you desire to swage the screw on, the screw and nut F G being separate for each size pipe; use screw and nut according to the size pipe you desire to swage the screw on. Then place the end of the pipe against the guide E, bringing the upper edge of the pipe between the swaging rollers H and I. Then turn the crank attached to the arms of the beading-machine, and a screw will be swaged on the end of the pipe, the mandrel B running out or in, according to the way you turn the crank. The drawings show the attachment run out about half way. When run clear out, the pipe is inserted between the rollers, and the upper one is secured down, and the crank is reversed, running the screw F back, the operation of the rollers being controlled by the screw F.

What I claim as my invention, and desire to secure by Letters Patent, is—

1. The screw F, nut G, swaging-rollers H and I, acting in combination, substantially as described.

2. Frame C, guide-standard D, guide E, nut L, and index-hand P, substantially as and for the purpose described.

HENRY E. ANDERSON.

Witnesses:
THOS. HARRIS,
O. A. AKIN.